United States Patent
Byers et al.

(10) Patent No.: US 6,394,519 B1
(45) Date of Patent: May 28, 2002

(54) ADJUSTABLE PICK-AND-PLACE TOOL FOR AN AUTOMATED ROBOTIC DEVICE OR THE LIKE

(75) Inventors: Rodney L. Byers, Madison; David L. Dennis, Sun Prairie, both of WI (US)

(73) Assignee: R&D Engineering & Macining, Inc., Sun Prairie, WI (US)

( * ) Notice: Subject to any disclaimer, the term of this patent is extended or adjusted under 35 U.S.C. 154(b) by 0 days.

(21) Appl. No.: 09/438,552

(22) Filed: Nov. 10, 1999

Related U.S. Application Data

(63) Continuation of application No. 09/049,491, filed on Mar. 27, 1998, now abandoned.

(51) Int. Cl.⁷ .............................. B66C 1/02; B25J 15/06
(52) U.S. Cl. .................... 294/64.1; 294/65.5; 294/86.4; 901/40; 248/683
(58) Field of Search .............................. 294/1.1, 2, 65, 294/65.5, 81.6, 86.4, 87.1, 64.1; 901/31, 37, 39, 40; 248/205.3, 206.5, 683; 414/912, 737; 29/743, 744

(56) References Cited

U.S. PATENT DOCUMENTS

| | | | |
|---|---|---|---|
| 3,442,399 A | 5/1969 | Snavely | 414/737 |
| 3,805,978 A | 4/1974 | Hahne | 294/65.5 |
| 3,960,279 A * | 6/1976 | Hartleroad et al. | 294/65.5 |
| 4,012,813 A * | 3/1977 | Martens et al. | 294/65.5 |
| 4,557,659 A * | 12/1985 | Scaglia | 294/65 |
| 4,571,320 A * | 2/1986 | Walker | 294/65 |
| 4,861,087 A | 8/1989 | Park | 294/119.1 |
| 5,018,776 A * | 5/1991 | Trygg | 294/87.1 |
| 5,609,377 A * | 3/1997 | Tanaka | 294/65 |
| 5,707,094 A | 1/1998 | Gower | 294/65 |
| 5,829,151 A * | 11/1998 | Collier et al. | 33/573 |
| 5,865,487 A | 2/1999 | Gore et al. | 294/65.5 |
| 5,932,065 A * | 8/1999 | Mitchell | 156/556 |
| 6,186,567 B1 * | 2/2001 | Blick | 294/86.4 |

* cited by examiner

Primary Examiner—Dean J. Kramer
Assistant Examiner—Paul T. Chin
(74) Attorney, Agent, or Firm—Michael Best & Friedrich LLP; Teresa J. Welch; Jeffrey D. Peterson

(57) ABSTRACT

Provided is a fully adjustable pick-and-place tool for an automated robotic device or the like which is capable of picking and placing various kinds of parts. The tool includes a plate and a magnet movably attached to the plate to pick-and-place parts having all sorts of configurations. A part manipulator including a suction cup or gripper mechanism or the like may be coupled to the magnet to pick-and-place the part. In one aspect of the present invention, the part manipulator is adjustably positionable with respect to the plate without having to move the magnet to a different location on the plate thereby further enhancing the ability of the tool to pick-and-place parts of different types having various shapes and sizes.

21 Claims, 7 Drawing Sheets

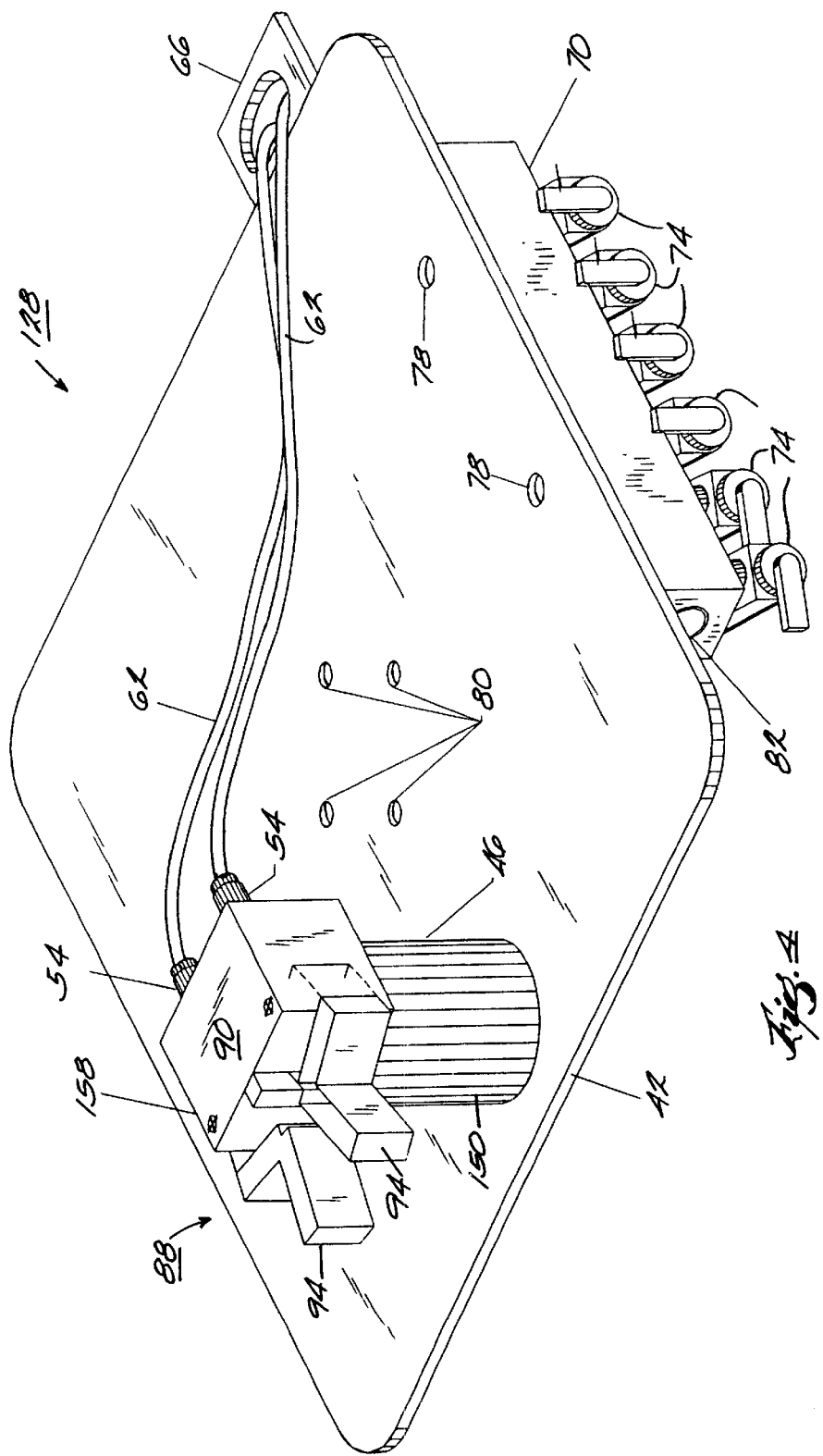

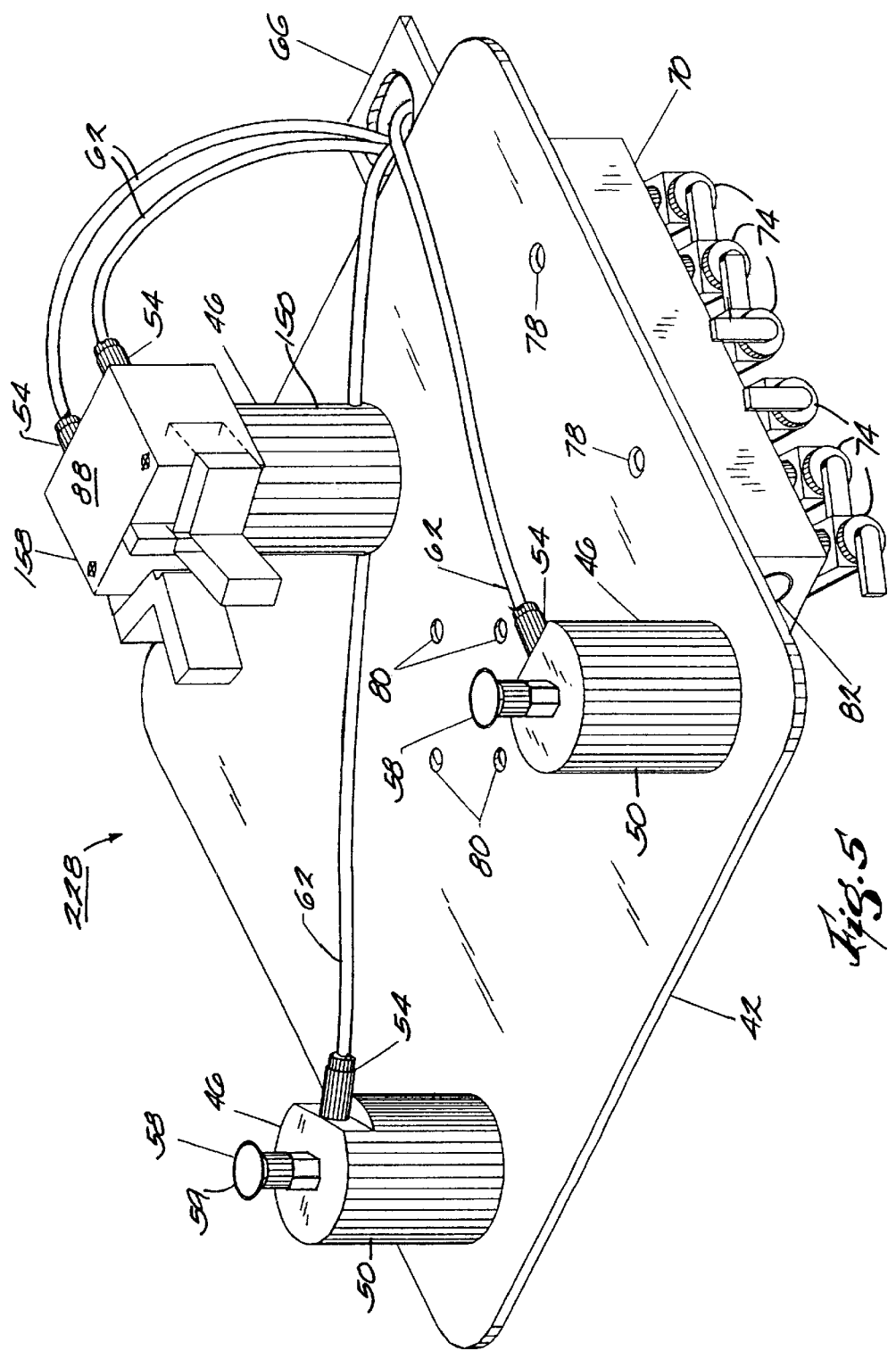

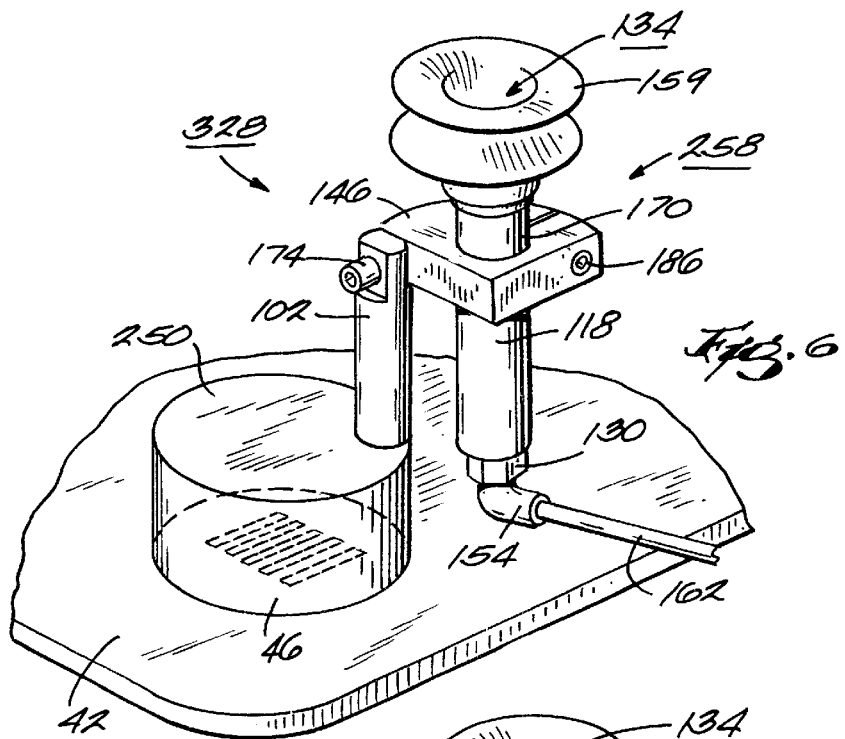
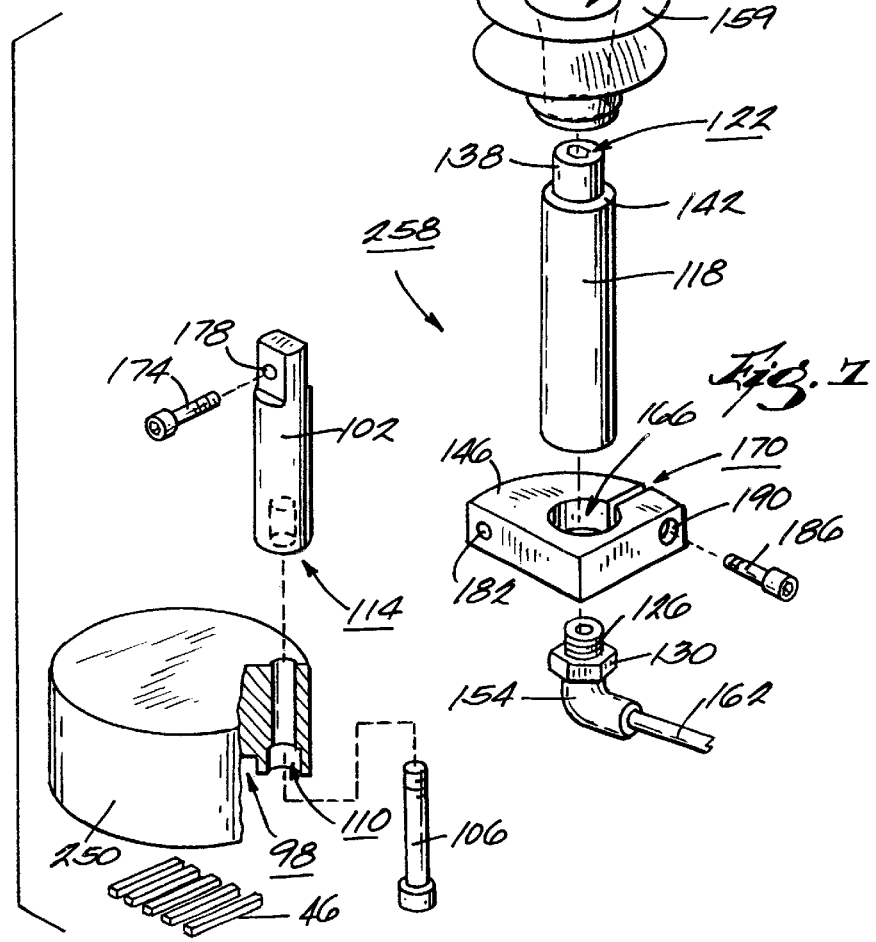

ADJUSTABLE PICK-AND-PLACE TOOL FOR AN AUTOMATED ROBOTIC DEVICE OR THE LIKE

CROSS-REFERENCE TO RELATED APPLICATION

This application is a continuation of U.S. application Ser. No. 09/049,491, filed on Mar. 27, 1998 now abandoned.

FIELD OF THE INVENTION

The present invention relates generally to pick-and-place tools for robotic devices or the like which are designed to pick a part or item from one location and place the part or item in another location.

BACKGROUND OF THE INVENTION

There are many known pick-and-place apparatuses. Such conventional equipment generally includes a robotic arm or similar structure having a mechanism attached to one end of the arm for picking and placing an item. The mechanism may be of many different kinds of tools known to those skilled in the art such as, for example, a magnetic device, a vacuum or suction device, a mechanical device or any other known device, depending on the characteristics of the item to be picked and placed.

As is generally known, a common problem with conventional part pick-and-place equipment relates to the inability of such equipment to effectively and efficiently handle items of varying shapes, sizes or pickup needs, as is frequently required in today's industry.

Accordingly, it is known to provide a part pick-and-place device with a vertical backbone-like frame. A plurality of slotted metal bars are adjustably mounted to the frame with conventional holding bolts with or without the use of mating nuts or lock nuts. Suction cups, magnets, mechanical grippers or the like are affixed to the free ends of the metal bars in order to pick-and-place an item as needed.

A problem with this type of known part picker and placer is the manner in which the slotted bars are adjusted with respect to the frame. In order to adjust the pick-and-place tool to accommodate items of different shapes, sizes or pickup needs, the holding bolts securing the slotted bars to the frame must be manually loosened to release the slotted bars from the frame. Thereafter, the slotted bars can be maneuvered such that the pick-and-place mechanism attached to the ends thereof can be properly positioned with respect to the items to be picked and placed. Not only is adjusting the bars in this manner cumbersome as well as time consuming, having to provide slots in the adjustable bars adds undesirable manufacturing costs to the overall pick-and-place tool.

Accordingly, what is needed is a pick-and-place tool which is easily adjustable for picking and placing a variety of items, which can be adjusted in an efficient manner, and which has enough versatility to be utilized in a number of different environments. The pick-and-place tool in accordance with the present invention accomplishes the foregoing features and yet is still economical to manufacture and use.

SUMMARY OF THE INVENTION

The foregoing and other advantages of the present invention are realized in one aspect thereof in which a pick-and-place tool includes a plate and at least one magnet attached to the plate. The magnet is easily moved to any location on the plate so as to enhance part picking and placing operations. In a further aspect of the present invention, the magnet includes a part manipulator coupled thereto so as to further enhance part picking and placing operations. In a preferred embodiment, the part manipulator is adjustably coupled to the magnet so that the part manipulator can be located in many different positions with respect to the plate without having to move the magnet, thereby allowing the pick-and-place tool to even better handle items of various shapes, sizes or pickup needs. In a highly preferred embodiment, there is provided a plurality of magnets and associated part manipulators which further increases the overall versatility of the pick-and-place tool.

Other features and advantages of the invention will become apparent to those skilled in the art upon review of the following detailed description, claims and drawings in which like numerals are used to designate like features.

BRIEF DESCRIPTION OF THE DRAWINGS

FIG. 4 is a top perspective view of an alternative embodiment of a pick-and-place tool according to the present invention.

FIG. 5 is a top perspective view of yet another alternative embodiment of a pick-and-place tool according to the present invention.

FIG. 6 is a partial top perspective view of still another alternative embodiment of a pick-and-place tool illustrating in further detail certain aspects of a magnet and part manipulator according to the present invention.

FIG. 7 is an exploded perspective view of the components shown in FIG. 6.

Figure 1:
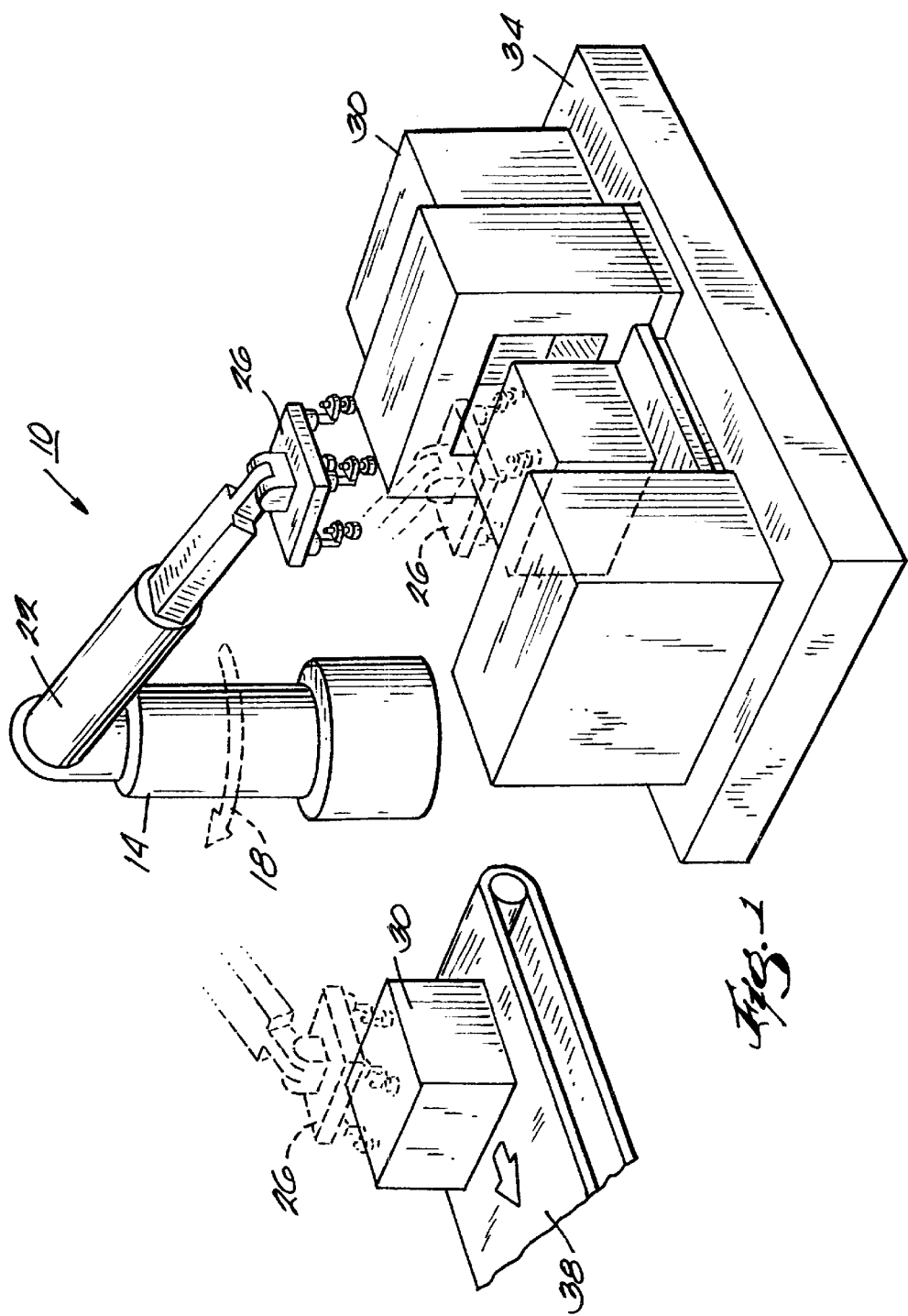
FIG. 1 is an illustrative view of a robotic part pick-and-place device in which the present invention is employed.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting.

DETAILED DESCRIPTION OF THE PREFERRED EMBODIMENTS

Illustrated in FIG. 1 is a robotic part pick-and-place device 10 in which the present invention is employed. It should be understood that the present invention is capable of use in other part pick-and-place devices or the like and the robotic device 10 and associated equipment is only provided as an example of one such arrangement. The device 10 includes a rotatable base 14 as illustrated by arrow 18, an arm 22 and a pick-and-place tool 26. As illustrated, arm 22 has a limited vertical movement by way of its connection with the base 14. A plurality of boxes 30 having different shapes and sizes are located on a platform 34, such as a receiving dock. A conveyor 38 is provided to transport boxes 30 to another location, such as a storage area in a warehouse. As is readily apparent, boxes 30 are placed on dock 34 and the robotic device 10 picks up the individual boxes 30 and places them on the conveyor 38. The robotic device 10 shown in FIG. 1 is capable of picking and placing boxes of different sizes because of the vertical movement of the arm 22. However, other robotic devices or the like in which the present invention may be employed do not have such capability. Moreover, in many situations, the parts to be picked and placed are not of a square or rectangular shape. Rather, the parts to be picked and placed are of various types having shapes with many different contours and configurations. For such parts, an adjustable pick-and-place tool is needed. Accordingly, the present invention is directed to a pick-and-place tool which is intended to improve the overall pick-and-place operations of a robotic device 10 or similar device by providing a pick-and-place tool which is fully adjustable so as to be able to handle different kinds of items of virtually any size or shape.

Figure 2:
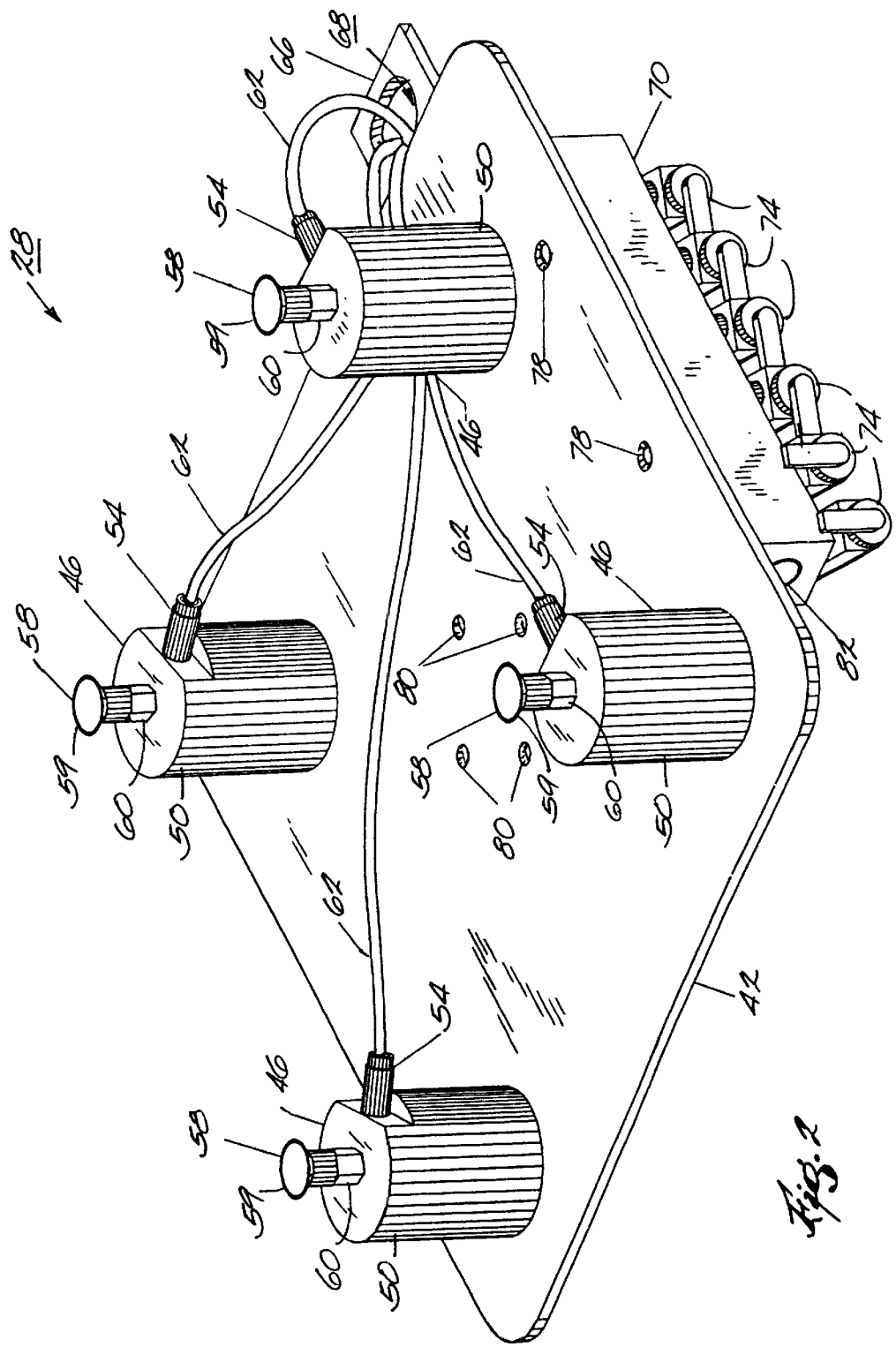
FIG. 2 is a top perspective view of one embodiment of a pick-and-place tool according to the present invention.

One embodiment of a pick-and-place tool 28 according to the present invention is illustrated in FIG. 2. The tool 28 includes a plate 42 which is capable of attracting a magnet. For example, the plate 42 can be made of a material having a ferrous content. Additionally, preferably, the plate 42 is made of a non-corrosive material, or is at least plated or covered with a corrosion resistant material, thereby allowing the pick-and-place tool to be used in harsh, corrosive environments. The size and shape of the plate 42 can vary depending on its primary intended use. When picking and placing larger, heavier parts, a larger, heavier plate will generally be needed. If a situation would normally require an extremely large and heavy plate, the plate can be made from a lighter base portion with a thin sheet, such as a ferrous metal sheet, applied or attached thereover so as to provide a sturdy, lightweight plate which is still capable of attracting a magnet. The tool 28 further includes at least one magnet 46 which is movably attached to plate 42. More than one magnet 46 may be used if desired. The total number of magnets depends on the size and/or quantity of parts to be picked and placed. The magnets described herein can be of any number of different types of magnets known to those skilled in the art and available from numerous commercial suppliers, so long as the magnets include enough holding capacity to remain adhered to the plate 42 while a part is picked and placed as shown, for example, in FIG. 1. Although not clearly shown in FIG. 2, preferably, each magnet 46 is embedded in a cut-out portion in the bottom of a magnet holder 50 with an epoxy type glue or cement (see, e.g., FIG. 7). Epoxies or the like adapted to secure a magnet to another structure are known to those skilled in the art and are readily available from numerous commercial suppliers. The magnet holders described herein may be of any material such as plastic, aluminum, metal, or other material suitable for use according to the principles of the present invention.

Each magnet holder 50 is adapted to accept a hose connector 54 and a part manipulator 58. The hose connectors 54 can be any number of different types of connectors known to those skilled in the art and readily available from numerous commercial sources, but a conventional push-in or snap-fit connector is particularly well suited for use according to the present invention. Although not clearly shown, each magnet holder 50 includes an appropriately sized and configured hole which is adapted to cooperate with the mating hose connector 54. The part manipulators may be of different designs capable of picking a part and releasing the part. In some applications, the magnets 46 themselves or other magnets secured to the magnet holders could be the part manipulators. However, suction or vacuum cups 59 as shown in FIG. 2, or mechanical grippers 88 as shown in FIG. 4, work particularly well according to the principles of the present invention. The type of part manipulator utilized will depend in part on the characteristics of the item being picked and placed. In the illustrated embodiment of FIG. 2, although not clearly shown, each magnet holder 50 includes a threaded hole adapted to receive a threaded portion of the respective part manipulator 58. The part manipulators 58 include hex portions 60 to enable the part manipulators 58 to be easily threaded into the mating holes in the magnet holders 50. Although not visible, the holes adapted to receive the hose connectors 54 and the holes adapted to receive the part manipulators 58 communicate so as to define a passageway through each magnet holder 50 for reasons which will be apparent below.

With continued reference to FIG. 2, each hose connector 54 is connected to a hose 62 in any way known to those skilled in the art. The plate 42 includes a hose guide 66 having an opening 68 therethrough which the hoses 62 extend. The hose guide 66 may actually be a part of the plate 42 or a separate part attached to the plate 42 by welding or otherwise. Alternatively, the hose guide 66 includes hose clips (not shown) which could be used to secure the hoses 62 to the plate 42.

On the bottom side of the plate 42 is a manifold 70 which includes on/off valves 74. The manifold 70 can be attached to the plate 42 in any number of different ways with various fasteners, but flathead screws extending through countersunk manifold mounting holes 78 in the plate 42 and into a portion of the manifold 70 works well according to the principles of the present invention. The countersunk holes and flathead screws will not interfere with the positioning of the magnets 46 on the plate 42. Likewise, countersunk mounting holes 80 allow the tool 28 to be attached to a robotic arm or the like with various fasteners or flathead screws for the same reason.

Figure 3:
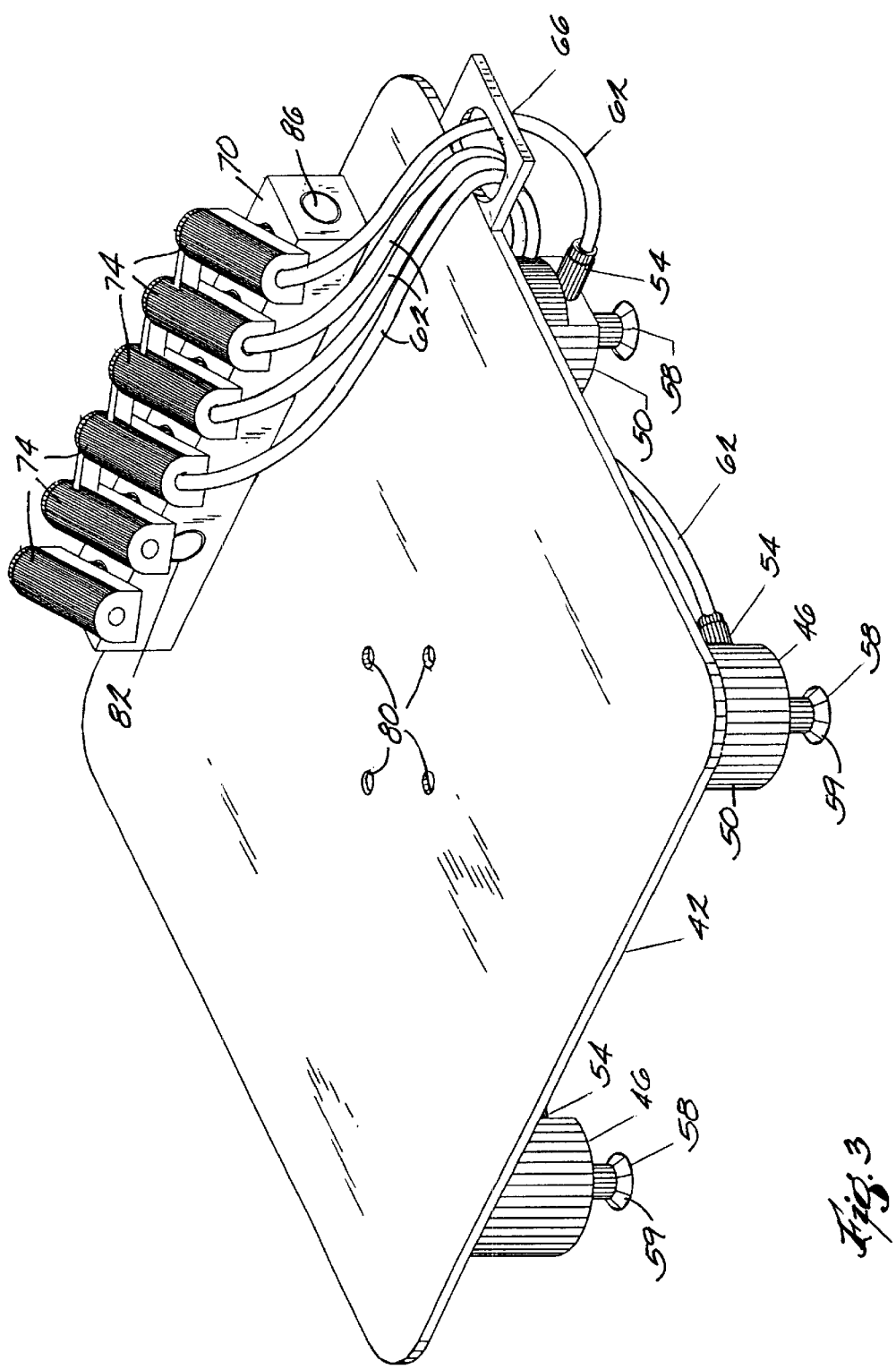
FIG. 3 is a bottom perspective view of the pick-and-place tool of FIG. 2.

The hoses 62 are connected to the on/off valves 74 (see FIG. 3) according to known methods. The manifold 70 is coupled to an auxiliary power device (not shown) which is capable of providing a vacuum or suction so that the part manipulators can properly pick a part, and which is also capable of releasing or interrupting the vacuum or suction so that the part manipulators can properly release and place the part. Alternatively, as will be further explained below, the manifold 70 is coupled to an auxiliary power device (not shown) which is capable of supplying pressure to the part manipulators so that the part manipulators can properly pick and place a part. If desired, the manifold 70 can accommodate a vacuum device as well as a pressure device, individually or collectively. The illustrated manifold 70 includes a pressure port 82 and a vacuum port 86 (FIG. 3). It should be understood that the manifold 70 can include as many pressure ports and/or vacuum ports as desired. The passageways within the magnet holders 50 enable the manifold 70, and therefore the auxiliary power device, to communicate with the part manipulators 58 to provide the desired function. As shown in FIG. 2, four on/off valves 74 are opened to accommodate the four part manipulators 58. The manifold 70 includes two additional on/off valves 74 which would allow the addition of two more magnets 46 and part manipulators 58 to the tool 28 if so desired.

With reference to FIGS. 2–3 in conjunction with FIG. 1, it should now be clearly understood that when a suction is provided to the manifold 70 and the valves 74 are opened, as the tool 28 is placed near a part 30 to be picked, the part manipulators 58 will secure the part 30 to the tool 28. In this manner, the part 30 is picked. To place the part 30 in a new location, either the manifold 70 is pressurized to reverse the suction action or the vacuum is turned off by the auxiliary power device or, in some cases, the appropriate valve 74 so as to release the part 30 from the tool 28. As should now also be clearly understood, the magnets and the associated part manipulators can easily be located anywhere on the plate 42 depending on the shape, size or pickup needs of the part to be picked and placed.

FIGS. 4 and 5 show alternative embodiments of a pick-and-place tool according to the present invention. FIG. 4 shows a single magnet 46, magnet holder 150 and part manipulator 158 on the plate 42 wherein the suction cup 59 of FIG. 2 is replaced with the mechanical gripper device 88. The mechanical gripper 88 may be attached to the magnet holder 150 in any number of different ways, such as, for example, with conventional fastening screws. The mechanical gripper 88 includes a chamber 90 and a pair of gripping arms 94. The gripper 88 is adapted to receive the hose connectors 54, and the gripping arms 94 are adapted to function in conjunction with a pressure supplying device (not shown) as a result of the communication with the manifold 70 and chamber 90. Upon pressurizing one side of the chamber 90, the gripper arms 94 function to grip and pick a part. Upon pressurizing another side of the chamber, the gripper arms 94 are caused to release and thereby place the part. Like the magnets 46 and part manipulators 58 of the pick-and-place tool 28 of FIG. 2, the magnet 46 and part manipulator 158 of the pick-and-place tool 128 can be placed in any location on plate 42 to accommodate parts of different shapes, sizes and pickup needs. FIG. 5 illustrates a pick-and-place tool 228 which combines a plurality of magnets 46 and part manipulators 58 of FIG. 2 with the magnet 46 and part manipulator 158 of FIG. 4. Accordingly, the manifold 70 is adapted to accommodate a vacuum supplying device and pressure supplying device as needed. In certain situations, depending on the type of part to be picked and placed as well as the shape and size of the particular part, different part manipulators may be needed. The combination of the plate and magnets is such that any number of magnets having various part manipulators can be attached to the plate to accommodate practically any part, no matter its shape, size or pickup needs. A feature of the present invention is the ability of the magnets to be moved and positioned in any location on the plate to enhance part picking and placing. Moreover, another feature of the present invention is the ability of various part manipulators to be coupled to the movable magnets in order to further enhance part picking and placing.

FIGS. 6 and 7 show another embodiment of a pick-and-place tool 328 according to the present invention. The part manipulators of FIGS. 2–5 are replaced with part manipulator 258. The magnet 46 is embedded in a cut-out portion 98 in the bottom of the magnet holder 250 with an appropriate epoxy. The magnet holder 250, and therefore the magnet 46, is positionable in any location on plate 42 according to the principles of the present invention. The part manipulator 258 includes a vertical rod 102 which is rigidly attached to the top side of the magnet holder 250. One way of attaching rod 102 to the magnet holder 250 is to pass a holding bolt 106 through a countersunk bore 110 in the magnet holder 250 and into a threaded hole 114 in the bottom of the rod 102. The part manipulator 258 further includes an extension arm 118 having a hole 122 completely therethrough for reasons which will be apparent below. A hose connector 154 is attached to the bottom of extension arm 118. In this embodiment, the hose connector 154 is provided with a set of threads 126 which is threaded into a threaded hole in the bottom of the arm 118 by way of hex head 130. Hose 162 is appropriately attached to hose connector 154 at one end and the other end is connected to a manifold like, for example, that described in reference to FIGS. 2–5. The part manipulator 258 also includes a suction cup 159 secured to the top of the extension arm 118 according to appropriate methods. In the illustrated embodiment, the suction cup 159 includes a bore 134 therethrough which at least partially fits over a recessed portion 138 of the arm 118 and up against a ledge 142 on the arm 118. To further secure the suction cup 159 to the arm 118, an appropriate epoxy may be used. Alternatively, for example, the arm 118 may include a threaded hole instead of recessed portion 138 and ledge 142, and the suction cup 159 could include a threaded portion to be received by the threaded hole. The part manipulator 258 also includes an adjustable connecting member 146. The connecting member 146 includes a hole 166 appropriately sized to receive the extension arm 118, and a slit 170 extending axially outward from the hole 166, for reasons which will be explained below.

As can be observed, connecting member 146 is attached to rod 102 by virtue of a fastener or holding bolt 174 extending through a hole 178 in the upper end of the rod 102 and into a threaded hole 182 in the connecting member 146. Extension arm 118 passes through hole 166 in connecting member 146 and is firmly fixed to the connecting member 146 when bolt 186 is threaded into threaded hole 190 of the connecting member 146 to close the slit 170. Hole 190 extends completely through a portion of the connecting member 146 located to one side of the slit 170 and at least partially into another portion of the connecting member 146 located on the opposite side of the slit 170, so that the bolt 186 is capable of closing the slit 170 when desired. Closing slit 170 causes the diameter of the hole 166 to shrink around the extension arm 118, thereby holding the extension arm 118 in place.

The part manipulator 258 of FIGS. 6 and 7 has the additional benefit of being fully adjustable independent of the movement of the magnet 46 or magnet holder 250. For example, to extend or retract extension arm 118 with respect to the plate 42, bolt 186 is simply loosened thereby opening slit 170 so that the extension arm 118 can be slid up or down with respect to connecting member 146. To change the angle of the extension arm 118 with respect to plate 42, bolt 174 is simply loosened, thereby allowing the connecting member 146 to be tilted so as to alter the location of the extension arm 118 with respect to the plate 42. It should be noted that the hole 122 in extension arm 118 allows the manifold to communicate with the part manipulator 258 much like the passageways through the magnet holders 50 of FIG. 2 allow the manifold 70 to communicate with the part manipulators 58.

Accordingly, tool 328 has increased versatility in terms of picking and placing various types of parts having many different shapes and sizes. The part manipulator 258 can be adjusted according to a particular need. It should be noted that the size of the part manipulators (e.g., length of extension arm 118 or rod 102) can be adjusted as desired. Moreover, various combinations of different part manipulators and/or part manipulators of varying sizes can be used according to a particular need. Advantageously, the holding bolts described herein may be conventional socket head cap screws or any other fastener suitable for use according to the principles of the present invention. Also, a suitable sealing tape known to those skilled in the art and readily available from numerous commercial suppliers may be used to seal any threaded connections between the components of the pick-and-place tool for reasons which will be apparent to those skilled in the art. The ease of which magnet 46 can be relocated anywhere on plate 42 adds to the overall functionability of the pick-and-place tool according to the principles of the present invention.

Figure 8:
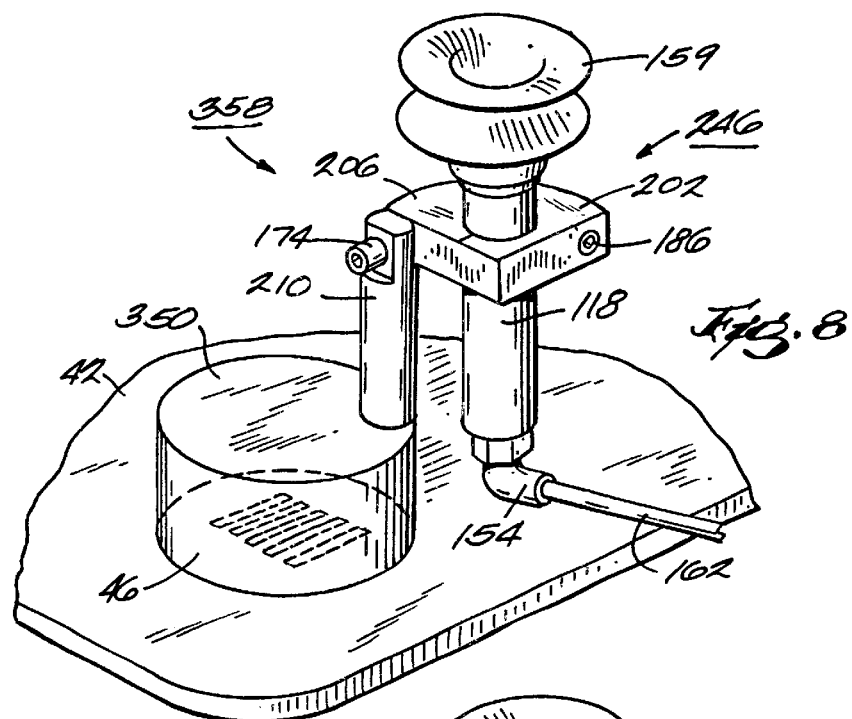
FIG. 8 is a partial top perspective view illustrating an alternative embodiment of the pick-and-place tool shown in FIG. 6.
Figure 9:
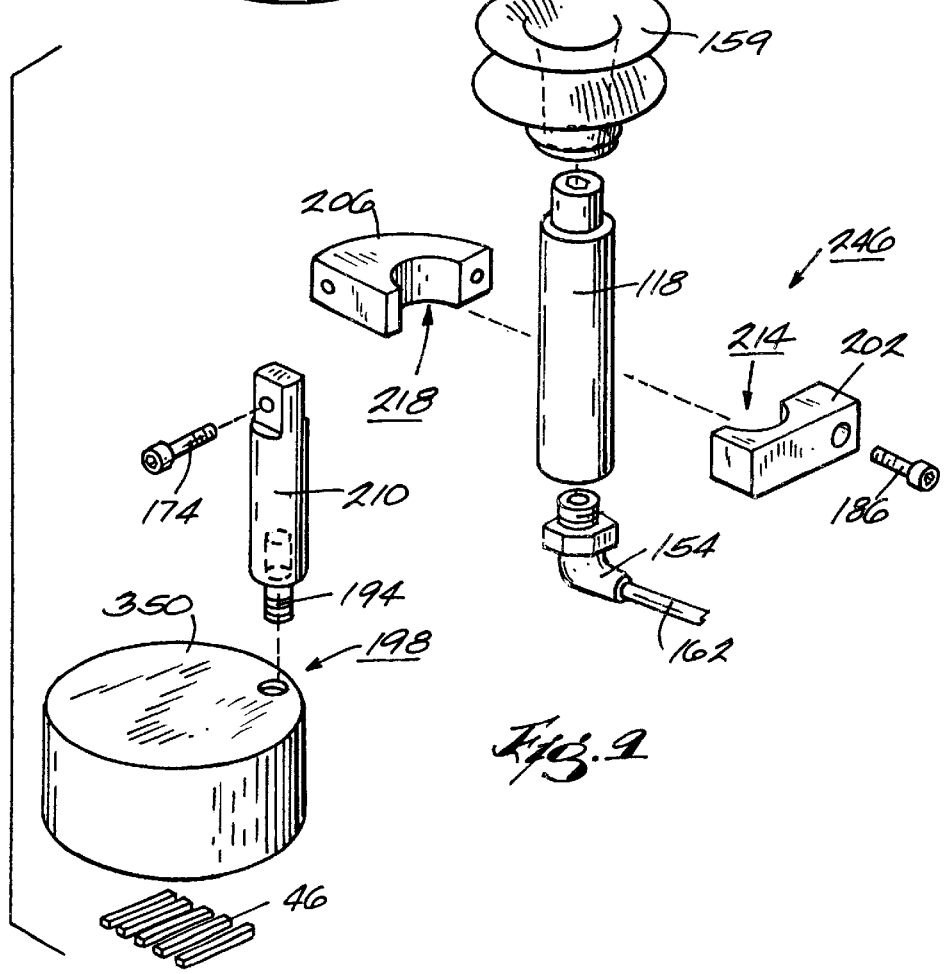
FIG. 9 is an exploded perspective view of the components shown in FIG. 8.

FIGS. 8 and 9 show an alternate arrangement of the part manipulator of FIGS. 6 and 7. Rod 210 includes a threaded portion 194 which is received by a threaded hole 198 in the top of the magnet holder 350. The adjustable connecting member 246 is made of two components 202 and 206, instead of a single component, including semi-circular portions 214 and 218, respectively, which are adapted to hold the extension arm 118 and allow the arm 118 to be adjusted as needed. In all other aspects, the part manipulator 358 of FIGS. 8 and 9 is virtually identical to the part manipulator 258 of FIGS. 6 and 7.

The foregoing description of the present invention has been presented for purposes of illustration and description. Furthermore, the description is not intended to limit the invention in the form disclosed herein. Consequently, variations and modifications commensurate with the above teachings in skill or knowledge of the relevant art, are within the scope of the present invention. Accordingly, the reader will see that the present invention can be easily adjusted to pick-and-place a variety of different parts with different layouts and different configurations. The embodiments described herein are further intended to explain the best modes known for practicing the invention and to enable others skilled in the art to utilize the invention as such, or other embodiments and with various modifications required by the particular applications or uses of the present invention. It is intended that the appended claims are to be construed to include alternative embodiments to the extent permitted by the prior art.

Various features of the invention are set forth in the following claims.

What is claimed is:

1. A pick-and-place tool comprising:

a plate;

a magnet which is magnetically attached to said plate, and which is movably mounted on said plate to pick-and-place an item as needed;

a magnet holder, said magnet embedded therein;

a part manipulator attached to said magnet holder, said part manipulator adapted to pick-and-place the item; and wherein said part manipulator is adjustably positionable respective to said plate irrespective of moving said magnet.

2. A pick-and-place tool according to claim 1, wherein said part manipulator is a suction cup and, wherein said magnet holder includes a passageway therethrough and, wherein said pick-and-place tool further comprises:

a hose connector attached to said magnet holder such that said suction cup communicates with said hose connector via said passageway;

a hose having opposite ends, one end connected to said hose connector; and a manifold connected to said other end of said hose such that a vacuum can be provided through said manifold, said hose, said passageway and said suction cup.

3. A pick-and-place tool according to claim 2, wherein said manifold includes an on/off valve.

4. A pick-and-place tool according to claim 3, wherein said magnet is movably mounted on one side of said plate and said manifold is attached to an opposite side of said plate and, wherein said plate includes a hose guide for directing said hose from said hose connector to said manifold.

5. A pick-and-place tool according to claim 4, wherein said plate includes at least one countersunk hole for receiving a fastener for attaching said manifold to said plate such that said fastener will not interfere with the placement of said magnet on said plate in any location.

6. A pick-and-place tool according to claim 1, wherein said part manipulator is a mechanical gripper device including a chamber and mechanical gripper arms interconnected to said chamber and, wherein said pick-and-place tool further comprises:

a hose connector attached to said chamber;

a hose having opposite ends, one end connected to said hose connector so that said mechanical gripper arms communicate with said hose via said chamber; and a manifold connected to said other end of said hose, such that a pressure can be provided to said manifold, said hose, said chamber and said mechanical gripper so as to operate said mechanical gripper arms.

7. A pick-and-place tool according to claim 6, wherein said manifold includes an on/off valve.

8. A pick-and-place tool according to claim 7, wherein said magnet is movably mounted on one side of said plate and said manifold is attached to an opposite side of said plate and, wherein said plate includes a hose guide so as to direct said hose from said hose connector to said manifold.

9. A pick-and-place tool according to claim 8, wherein said plate includes at least one countersunk hole for receiving a fastener for attaching said manifold to said plate such that said fastener will not interfere with the placement of said magnet on said plate in any location.

10. A pick-and-place tool according to claim 1, wherein said part manipulator includes a suction cup and, wherein said pick-and-place tool further comprises:

a manifold operatively coupled to said suction cup so that a vacuum can be applied to said suction cup to pick the item, and so that the vacuum to the suction cup can be released or reversed so as to release and place the item.

11. A pick-and-place tool according to claim 10, further comprising:

a hose connector coupled to said suction cup; and a hose having opposite ends, one end connected to said hose connector and said other end connected to said manifold.

12. A pick-and-place tool according to claim 11, wherein said part manipulator further comprises an extension arm having a hole therethrough and opposite ends, said suction cup attached to one of said ends of said extension arm and said hose connector attached to said other end of said extension arm, said suction cup and said hose connector communicating via said hole.

13. A pick-and-place tool according to claim 1, further comprising at least one additional magnet movably mounted on said plate and being adapted to pick-and-place the item.

14. A pick-and-place tool according to claim 1, wherein said plate is made of a ferrous material.

15. A pick-and-place tool according to claim 1, wherein said plate is made of a non-corrosive material.

16. A pick-and-place tool comprising:

a plate;

a magnet which is magnetically attached to said plate, and which is movably mounted on said plate to pick-and-place an item as needed;

a magnet holder, said magnet embedded therein;

a part manipulator attached to said magnet holder, said part manipulator adapted to pick-and-place the item, and is adjustably positionable respective to said plate irrespective of moving said magnet; said part manipulator includes a suction cup;

a manifold operatively coupled to said suction cup so that a vacuum can be applied to said suction cup to pick the item, and so that the vacuum to the suction cup can be released or reversed so as to release and place the item;

a hose connector coupled to said suction cup; and a hose having opposite ends, one end connected to said hose connector and said other end connected to said manifold;

said part manipulator further comprises an extension arm having a hole therethrough and opposite ends, said suction cup attached to one of said ends of said extension arm and said hose connector attached to said other end of said extension arm, said suction cup and said hose connector communicating via said hole; and said part manipulator further comprises a support rod attached to a top side of said magnet holder and, wherein said part manipulator further includes an adjustable connecting member for releasably holding said extension arm to allow said extension arm to move in or out with respect to said connecting member for adjusting the location of said suction cup with respect to the item to be picked and, wherein said connecting member is adjustably firmly attached to said support rod, the angle of said extension arm with respect to said plate being changeable.

17. A pick-and-place tool according to claim 16, wherein said manifold includes an on/off valve.

18. A pick-and-place tool according to claim 17, wherein said magnet is movably mounted on one side of said plate and said manifold is attached to an opposite side of said plate and, wherein said plate includes a hose guide for directing said hose from said hose connector to said manifold.

19. A pick-and-place tool according to claim 18, wherein said plate includes at least one countersunk hole receiving a fastener for attaching said manifold to said plate such that said fastener will not interfere with the placement of said magnet on said plate in any location.

20. A pick-and-place tool according to claim 16, wherein said connecting member is made of a single piece of material having a hole therethrough for receiving said extension arm and further having a slit extending axially outward from said connecting member hole and a recloseable fastener for closing said slit to hold said extension arm and opening said slit to allow said extension arm to be moved in and out with respect to said connecting member.

21. A pick-and-place tool according to claim 16, wherein said connecting member is made of two pieces of material each including a semi-circular groove extending at least partially around an outer surface of said extension arm when said extension arm is held by said connecting member, said two pieces connectable by at least one fastener to firmly hold said extension arm when desired, and said two pieces of material disconnectable to allow said extension arm to be moved in and out with respect to said connecting member.

* * * * *